US010377840B2

(12) United States Patent
Meerscheidt et al.

(10) Patent No.: US 10,377,840 B2
(45) Date of Patent: *Aug. 13, 2019

(54) ETHYLENE ACID COPOLYMERS, THEIR IONOMERS, AND THEIR USE IN PACKAGING FILMS AND INJECTION MOLDED ARTICLES

(71) Applicant: E I DU PONT DE NEMOURS AND COMPANY, Wilmington, DE (US)

(72) Inventors: Shannon D Meerscheidt, Bridge City, TX (US); Steven C Pesek, Orange, TX (US); W Alexander Shaffer, Orange, TX (US); Charles Anthony Smith, Vienna, WV (US)

(73) Assignee: E.I. Du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,253

(22) Filed: Jun. 8, 2017

(65) Prior Publication Data

US 2017/0369610 A1     Dec. 28, 2017

Related U.S. Application Data

(63) Continuation of application No. 14/560,663, filed on Dec. 4, 2014, now abandoned.

(60) Provisional application No. 62/017,711, filed on Jun. 26, 2014.

(51) Int. Cl.
| | |
|---|---|
| *C08L 23/08* | (2006.01) |
| *C08K 5/053* | (2006.01) |
| *C08K 5/544* | (2006.01) |
| *C08F 210/02* | (2006.01) |
| *A63B 37/00* | (2006.01) |
| *C08J 5/18* | (2006.01) |
| *C08K 5/5435* | (2006.01) |

(52) U.S. Cl.
CPC ........ *C08F 210/02* (2013.01); *A63B 37/0003* (2013.01); *C08J 5/18* (2013.01); *C08K 5/544* (2013.01); *C08K 5/5435* (2013.01); *A63B 37/0024* (2013.01); *A63B 37/0039* (2013.01); *A63B 37/0051* (2013.01); *C08F 2810/20* (2013.01); *C08J 2323/08* (2013.01); *C08K 5/053* (2013.01)

(58) Field of Classification Search
None
See application file for complete search history.

(56) References Cited

U.S. PATENT DOCUMENTS 3,404,134 A    10/1968  Rees

| | | |
|---|---|---|
| 3,952,135 A | 4/1976 | Priddle et al. |
| 4,714,253 A | 12/1987 | Nakahara et al. |
| 4,857,258 A | 8/1989 | Le Doux et al. |
| 4,937,035 A | 6/1990 | Richter |
| 4,944,906 A | 7/1990 | Colby et al. |
| 5,028,674 A | 7/1991 | Hatch et al. |
| 5,094,921 A | 3/1992 | Itamura et al. |
| 5,439,227 A | 8/1995 | Egashira et al. |
| 5,452,898 A | 9/1995 | Yamagishi et al. |
| 5,553,852 A | 9/1996 | Higuchi et al. |
| 5,752,889 A | 5/1998 | Yamagishi et al. |
| 5,782,703 A | 7/1998 | Yamagishi et al. |
| 5,782,707 A | 7/1998 | Yamagishi et al. |
| 5,788,890 A | 8/1998 | Grey et al. |
| 5,803,833 A | 9/1998 | Nakamura et al. |
| 5,807,192 A | 9/1998 | Yamagishi et al. |
| 6,179,732 B1 | 1/2001 | Inoue et al. |
| 6,207,761 B1 | 3/2001 | Smith et al. |
| 6,500,888 B2 | 12/2002 | Baumgartner et al. |
| 6,518,365 B1 | 2/2003 | Powell et al. |
| 6,699,027 B2 | 3/2004 | Murphy et al. |
| 6,833,420 B1 | 12/2004 | Yoshikawa et al. |
| 6,866,158 B1 | 3/2005 | Sommer et al. |
| 6,992,145 B2 | 1/2006 | Ichikawa et al. |
| 7,005,098 B2 | 2/2006 | Cavallaro et al. |
| 7,128,864 B2 | 10/2006 | Kennedy, III et al. |
| 7,201,672 B2 | 4/2007 | Yamagishi et al. |
| 7,438,940 B2 | 10/2008 | Morris et al. |
| 7,635,509 B2 | 12/2009 | Chen |
| 7,641,965 B1 | 1/2010 | Bennison et al. |
| 8,044,136 B2 | 10/2011 | De Garavilla |
| 8,110,138 B2 | 2/2012 | Uradnisheck |
| 8,202,925 B2 | 6/2012 | De Garavilla |
| 8,334,033 B2 | 12/2012 | Hausmann et al. |
| 8,399,096 B2 | 3/2013 | Hausmann et al. |
| 2002/0175136 A1 | 11/2002 | Bouix et al. |
| 2002/0180083 A1 | 12/2002 | Yaniger |
| 2005/0058498 A1 | 3/2005 | Botto |
| 2005/0129888 A1 | 6/2005 | Kwon |

(Continued)

FOREIGN PATENT DOCUMENTS

| | | |
|---|---|---|
| EP | 0855155 A1 | 7/1998 |
| EP | 1816147 A1 | 8/2007 |

(Continued)

OTHER PUBLICATIONS

PCT International Search Report for International Application No. PCT/US2014/068786 dated Mar. 9, 2015.

*Primary Examiner* — David J Buttner
(74) *Attorney, Agent, or Firm* — Dinsmore & Shohl LLP

(57) ABSTRACT

Provided are novel ethylene acid copolymers, their ionomers and their use in various articles, including packaging films and injection molded articles. The ethylene acid copolymers comprise copolymerized units of ethylene, about 10 to about 30 wt % of copolymerized units of a first α,β-unsaturated carboxylic acid having 3 to 10 carbon atoms; and about 5 to about 15 wt % of copolymerized units of a derivative of a second α,β-unsaturated carboxylic acid having 3 to 10 carbon atoms. Preferred derivatives include esters, and in particular alkyl esters. These ethylene acid copolymers and ionomers have improved optical properties when compared to conventional ethylene acrylic or methacrylic acid copolymers and their ionomers.

20 Claims, No Drawings

(56) References Cited

U.S. PATENT DOCUMENTS

| | | |
|---|---|---|
| 2006/0043632 A1 | 3/2006 | Andersen |
| 2006/0094824 A1 | 5/2006 | Roulin et al. |
| 2006/0273485 A1 | 12/2006 | Higuchi et al. |
| 2007/0282069 A1 | 2/2007 | Egashira et al. |
| 2009/0099313 A1 | 4/2009 | Uradnisheck |
| 2009/0126859 A1 | 5/2009 | Cadwallader et al. |
| 2009/0151772 A1 | 6/2009 | Hayes et al. |
| 2010/0272898 A1 | 10/2010 | Chen et al. |
| 2010/0304893 A1 | 12/2010 | De Garavilla |
| 2011/0028622 A1 | 2/2011 | Uradnisheck |
| 2011/0071259 A1 | 3/2011 | Nakano et al. |
| 2015/0174453 A1 | 6/2015 | Bishop et al. |
| 2015/0315320 A1 | 11/2015 | Pesek et al. |
| 2015/0343745 A1* | 12/2015 | Pesek ............... B32B 17/10018 428/412 |
| 2015/0376310 A1* | 12/2015 | Meerscheidt ...... A63B 37/0003 525/329.7 |
| 2017/0342182 A1* | 11/2017 | Pesek ............... B32B 17/10018 |

FOREIGN PATENT DOCUMENTS

| | | | |
|---|---|---|---|
| JP | 2002121341 A | | 4/2002 |
| JP | LP-2002121341 | * | 4/2002 |
| WO | 98/08227 A1 | | 9/1998 |
| WO | 03/045186 A1 | | 6/2003 |
| WO | 2004/062881 A1 | | 7/2004 |
| WO | 2008/010597 A1 | | 1/2008 |
| WO | 2010/230464 A1 | | 3/2010 |
| WO | 2014/100301 A1 | | 6/2014 |
| WO | 2014/100309 A1 | | 6/2014 |
| WO | 2014/100313 A1 | | 6/2014 |

\* cited by examiner

ETHYLENE ACID COPOLYMERS, THEIR IONOMERS, AND THEIR USE IN PACKAGING FILMS AND INJECTION MOLDED ARTICLES

CROSS-REFERENCES TO RELATED APPLICATIONS

The present application claims priority under 35 U.S.C. § 120 as a continuation of U.S. application Ser. No. 14/560,663, filed on Dec. 4, 2014 now abandoned, which in turn claims priority under 35 U.S.C. § 119 to U.S. Prov. App. No. 62/017,711, filed on Jun. 26, 2014, each of which is incorporated herein by reference in their entireties.

FIELD OF THE INVENTION

Provided are novel ethylene acid copolymers, ionomers of the ethylene acid copolymers, and the use of these copolymers and ionomers in various materials, including packaging films and injection molded articles. These copolymers and ionomers show improved optical properties when compared to conventional ethylene acrylic or methacrylic acid copolymers and their ionomers.

BACKGROUND OF THE INVENTION

Several patents, patent applications and publications are cited in this description in order to more fully describe the state of the art to which this invention pertains. The entire disclosure of each of these patents, patent applications and publications is incorporated by reference herein.

Ionomers are copolymers produced by partially or fully neutralizing the carboxylic acid groups of precursor or parent polymers that are acid copolymers comprising copolymerized residues of α-olefins and α,β-ethylenically unsaturated carboxylic acids. A variety of articles made from ionomers by injection molding processes have been used in our daily life.

For example, golf balls with ionomer-containing covers have been produced by injection molding. See, e.g.; U.S. Pat. Nos. 4,714,253; 5,439,227; 5,452,898; 5,553,852; 5,752,889; 5,782,703; 5,782,707; 5,803,833; 5,807,192; 6,179,732; 6,699,027; 7,005,098; 7,128,864; 7,201,672; and U.S. Patent Appln. Pubin. Nos. 2006/0043632; 2006/0273485; and 2007/0282069.

Ionomers have also been used to produce injection molded hollow articles, such as containers. See, e.g., U.S. Pat. Nos. 4,857,258; 4,937,035; 4,944,906; 5,094,921; 5,788,890; 6,207,761; and U.S. Pat. No. 6,866,158, U.S. Patent Publication Nos. 20020180083; 20020175136; and 20050129888, European Patent Nos. EP1816147 and EP0855155, and PCT Patent Publn. Nos. WO2004062881; WO2008010597; and WO2003045186.

In addition, the use of ionomers for packaging films, injection molded articles, and other end-uses is well known in the art. Some films are designed to be breathable, to allow oxygen and/or moisture to pass through, to exhibit elastic properties, or to protect the materials they surround. See, for example, U.S. Pat. Nos. 7,438,940 and 7,635,509; and U.S. Patent Appln. Publn. Nos. 2006/0094824 and US2010/0272898. Ionomeric materials can also be used to fabricate blown films and thermoformed articles. See, for example, U.S. Patent Appln. Pubin. Nos. 2011/0028622 and 2009/0099313 and U.S. Pat. No. 8,110,138.

There remains a need, however, for polymers having improved optical properties. For example, containers produced by injection molding often have thick wall structures. When ionomers are used in forming such injection molded containers, the optical properties may suffer due to the thickness of the wall. There is a need, especially in the cosmetics industry, to develop containers and films that are made of ionomer compositions and that have improved optical properties.

SUMMARY OF THE INVENTION

Provided herein is an ethylene acid copolymer comprising copolymerized units of ethylene, about 10 to about 30 wt % of copolymerized units of a first α,β-unsaturated carboxylic acid having 3 to 10 carbon atoms; and about 5 to about 15 wt % of copolymerized units of a derivative of a second α,β-unsaturated carboxylic acid having 3 to 10 carbon atoms. The weight percentages of the copolymerized units are based on the total weight of the ethylene acid copolymer. Optionally, at least a portion of the carboxylic acid groups of the copolymerized α,β-unsaturated carboxylic acid units are neutralized to form carboxylate salts.

Further provided are packaging films, injection-molded articles such as containers, golf balls and components of golf balls, and other structures comprising the ethylene acid copolymers and ionomers described herein.

DETAILED DESCRIPTION

The following definitions apply to the terms as used throughout this specification, unless otherwise limited in specific instances.

The technical and scientific terms used herein have the meanings that are commonly understood by one of ordinary skill in the art to which this invention belongs. In case of conflict, the present specification, including the definitions herein, will control.

The term "a finite amount", as used herein, refers to an amount that is greater than zero.

As used herein, the terms "comprises," "comprising," "includes," "including," "containing," "characterized by," "has," "having" or any other variation thereof, refer to a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format. Optional additives as defined herein, at a level that is appropriate for such additives, and minor impurities are not excluded from a composition by the term "consisting essentially of".

When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

The indefinite articles "a" and "an" and the definite article "the" are employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; that is, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). Exclusive "or" is designated herein by terms such as "either A or B" and "one of A or B", for example.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

Unless stated otherwise, all percentages, parts, ratios, and like amounts, are defined by weight.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "dipolymer" refers to polymers consisting essentially of two monomers, and the term "terpolymer" refers to polymers consisting essentially of three monomers.

The term "acid copolymer" as used herein refers to a polymer comprising copolymerized units of an $\alpha$-olefin, an $\alpha,\beta$-ethylenically unsaturated carboxylic to acid, and optionally other suitable comonomer(s) such as, an $\alpha,\beta$-ethylenically unsaturated carboxylic acid ester.

The term "(meth)acrylic", as used herein, alone or in combined form, such as "(meth)acrylate", refers to acrylic or methacrylic, for example, "acrylic acid or methacrylic acid", or "alkyl acrylate or alkyl methacrylate".

The term "ionomer" as used herein refers to a polymer that comprises ionic groups that are carboxylate salts, for example, ammonium carboxylates, alkali metal carboxylates, alkaline earth carboxylates, transition metal carboxylates and/or combinations of such carboxylates. Such polymers are generally produced by partially or fully neutralizing the carboxylic acid groups of precursor or parent polymers that are acid copolymers, as defined herein, for example by reaction with a base. An example of an alkali metal ionomer as used herein is a zinc/sodium mixed ionomer (or zinc/sodium neutralized mixed ionomer), for example a copolymer of ethylene and methacrylic acid wherein all or a portion of the carboxylic acid groups of the copolymerized methacrylic acid units are in the form of zinc carboxylates and sodium carboxylates.

Finally, although methods and materials similar or equivalent to those described herein can be used in the practice or testing of the invention, suitable methods and materials are described herein. Moreover, the materials, methods, and examples herein are illustrative only and, except as specifically stated, are not intended to be limiting.

Provided herein is an ethylene acid copolymer that comprises copolymerized units of ethylene, about 10 to about 30 wt % of copolymerized units of a first $\alpha,\beta$-unsaturated carboxylic acid having 3 to 10, preferably 3 to 8, carbon atoms; and about 5 to about 15 wt % of copolymerized units of a derivative of a second $\alpha,\beta$-unsaturated carboxylic acid having 3 to 10, preferably 3 to 8, carbon atoms. In some preferred ethylene acid copolymers, the amount of copolymerized acid(s) is about 15 to about 25 wt %, or about 20 to 24 wt %, or about 22 wt %. In some preferred ethylene acid copolymers, the amount of copolymerized acid derivative(s) is about 8 to about 12 wt %, or about 10 wt %. In some preferred ethylene acid copolymers, the sum of the weight percentages of the copolymerized acid and acid derivative is about 20 to about 45 wt %. The weight percentages of the copolymerized units are based on the total weight of the ethylene acid copolymer, and the sum of the weight percentages of the copolymerized units is 100 wt %. Optionally, at least a portion of the carboxylic acid groups of the copolymerized units of the $\alpha,\beta$-unsaturated carboxylic acid units are neutralized to form carboxylate salts.

Suitable first $\alpha,\beta$-ethylenically unsaturated acid comonomers include, without limitation, acrylic acid, methacrylic acid, itaconic acid, maleic acid, fumaric acid, and mixtures of two or more thereof. In one preferred copolymer, the α,β-ethylenically unsaturated carboxylic acid is selected from acrylic acid, methacrylic acid, and mixtures of two or more thereof. In another preferred copolymer, the α,β-ethylenically unsaturated carboxylic acid is methacrylic acid.

The ethylene acid copolymer further comprises copolymerized units of one or more additional comonomer(s), such as a second α,β-ethylenically unsaturated carboxylic acid having 3 to 10, or preferably 3 to 8 carbons, or derivatives thereof. Suitable acid derivatives include acid anhydrides, amides, and esters. Esters are preferred, and alkyl esters are more preferred. Specific examples of more preferred esters of unsaturated carboxylic acids include, without limitation, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, poly(ethylene glycol) acrylate, poly(ethylene glycol) methacrylate, poly(ethylene glycol) methyl ether acrylate, poly(ethylene glycol) methyl ether methacrylate, poly(ethylene glycol) behenyl ether acrylate, poly(ethylene glycol) behenyl ether methacrylate, poly(ethylene glycol) 4-nonylphenyl ether acrylate, poly(ethylene glycol) 4-nonylphenyl ether methacrylate, poly(ethylene glycol) phenyl ether acrylate, poly(ethylene glycol) phenyl ether methacrylate, dimethyl maleate, diethyl maleate, dibutyl maleate, dimethyl fumarate, diethyl fumarate, dibutyl fumarate, dimethyl fumarate, vinyl acetate, vinyl propionate, and mixtures of two or more thereof. In one preferred copolymer, the suitable additional comonomers are selected from methyl acrylate, methyl methacrylate, n-butyl acrylate, n-butyl methacrylate, isobutyl acrylate, isobutyl methacrylate, glycidyl methacrylate, vinyl acetate, and mixtures of two or more thereof. In another preferred ethylene compolymer, the first α,β-ethylenically unsaturated carboxylic acid is the same as the second α,β-ethylenically unsaturated carboxylic acid; in yet another preferred ethylene copolymer, however, the first and the second α,β-ethylenically unsaturated carboxylic acids are different.

Suitable ethylene acid copolymers have a melt flow rate (MFR) of about 1 to about 4000 g/10 min, or about 1 to 1000 g/10 min, or about 20 to about 400 g/10 min, as determined in accordance with ASTM method D1238-89 at 190° C. and 2.16 kg.

Finally, suitable ethylene acid copolymers may be synthesized as described in U.S. Pat. Nos. 3,404,134; 5,028,674; 6,500,888; 6,518,365; 8,334,033, or U.S. Pat. No. 8,399,096, for example. In one embodiment, a method described in U.S. Pat. No. 8,399,096 is used, and a sufficiently high level and complementary amount of the derivative of the second α,β-ethylenically unsaturated carboxylic acid is present in the reaction mixture.

To obtain the ionomers, the ethylene acid copolymers are partially neutralized by reaction with one or more bases. An example of a suitable procedure for neutralizing the ethylene acid copolymers is described in U.S. Pat. Nos. 3,404,134 and 6,518,365. After neutralization, about 1% to about 90%, or about 10% to about 60%, or about 20% to about 55%, or about 20 to about 30% of the hydrogen atoms of carboxylic acid groups present in the ethylene acid copolymer are replaced by other cations. Stated alternatively, about 1% to about 90%, or about 10% to about 60%, or about 20% to about 55%, or about 20 to about 30% of the total content of the carboxylic acid groups present in the ethylene acid copolymer are neutralized. In another alternative expression, the acid groups are neutralized to a level of about 1% to about 90%, or about 10% to about 60%, or about 20% to about 55%, or about 20 to about 30%, based on the total content of carboxylic acid groups present in the ethylene acid copolymers as calculated or measured for the non-neutralized ethylene acid copolymers. The neutralization level can be tailored for the specific end-use.

The ionomers comprise cations as counterions to the carboxylate anions. Suitable cations include any positively charged species that is stable under the conditions in which the ionomer composition is synthesized, processed and used. Suitable cations may be used in combinations of two or more. In some preferred ionomers, the cations are metal cations, which may be monovalent, divalent, trivalent, or multivalent. Useful monovalent metal cations include but are not limited to cations of sodium, potassium, lithium, silver, mercury, copper, and the like. Useful divalent metal cations include but are not limited to cations of beryllium, magnesium, calcium, strontium, barium, copper, cadmium, mercury, tin, lead, iron, cobalt, nickel, zinc, and the like. Useful trivalent metal cations include but are not limited to cations of aluminum, scandium, iron, yttrium, and the like. Useful multivalent metal cations include but are not limited to cations of titanium, zirconium, hafnium, vanadium, tantalum, tungsten, chromium, cerium, iron, and the like. When the metal cation is multivalent, complexing agents such as stearate, oleate, salicylate, and phenolate radicals may be included, as described in U.S. Pat. No. 3,404,134. In another preferred composition, the metal cations used are monovalent or divalent metal cations. Preferred metal cations are sodium, lithium, magnesium, zinc, potassium, and combinations of two or more of these metal cations. In a more preferred composition, the cations are sodium cations, zinc cations and combinations of sodium and zinc cations.

The resulting neutralized ionomer has a melt index, as determined in accordance with ASTM method D1238-89 at 190° C. and 2.16 kg, that is lower than that of the corresponding ethylene acid copolymer. The ionomer's melt index depends on a number of factors, including the melt index of the ethylene acid copolymer, the amount of copolymerized acid, the neutralization level, the identity of the cation and its valency. Moreover, the desired value of the ionomer's melt index may be determined by its intended end use. Preferably, however, the ionomer has a melt index of about 1000 g/10 min or less, about 750 g/10 min or less, about 500 g/10 min or less, about 250 g/10 min or less, about 100 g/10 min or less, about 50 g/10 min or less, about 25 g/10 min or less, or about of 20 g/10 min or less, or about 10 g/10 min or less, or about 5 g/10 min or less, or about 0.7 to about 7.5 g/10 min, as determined in accordance with ASTM method D1238-89 at 190° C. and 2.16 kg.

The ethylene acid copolymers and ionomers described herein may be formulated into compositions that further comprise additives known within the art. The additives include, but are not limited to, processing aids, flow enhancing additives, lubricants, pigments, dyes, flame retardants, impact modifiers, nucleating agents, anti-blocking agents such as silica, thermal stabilizers, UV absorbers, UV stabilizers, dispersants, surfactants, chelating agents, coupling agents, reinforcement additives, such as glass fiber, fillers and the like. General information about suitable additives, suitable levels of the additives in the ethylene acid copolymers and ionomers, and methods of incorporating the additives into the ethylene acid copolymers and ionomers may be found in reference texts such as, for example, the *Kirk Othmer Encyclopedia*, the *Modern Plastics Encyclopedia*, McGraw-Hill (New York, 1995) or the *Wiley Encyclopedia of Packaging Technology*, 2d edition, A. L. Brody and K. S. Marsh, Eds., Wiley-Interscience (Hoboken, 1997). Four types of additives are of note for use in the ionomeric polymers, specifically thermal stabilizers, UV absorbers, hindered amine light stabilizers (HALS), and silane coupling agents. Further information about these four types of additives, such as preferred examples and suitable levels in ionomeric polymers, may be found in the reference texts cited above and in U.S. Pat. No. 7,641,965, for example.

In some preferred compositions, the ethylene acid copolymers or ionomers are cross-linked. Several methods of decreasing the melt flow of ethylene acid copolymers and their ionomers are known and are described in U.S. Patent Appln. Publn. No. 2009/0126859, by Cadwallader et al., for example. Organic peroxides, in particular, have been used as cross-linking agents for ethylene acid copolymers and their ionomers. In more preferred compositions, however, the copolymer composition includes a hydroxyl-containing crosslinking agent and one or more silane adjuvants. These cross-linking systems are described in detail in U.S. Patent Appln. Publn. Nos. 2015/0343745; and 2015/0315320, by Pesek et al., and in Intl. Patent Appln. Publn. Nos. WO2014/100301; WO2014/100309; and WO2014/100313, also by Pesek et al. Briefly, however, the term "hydroxyl-containing crosslinking agent" refers to any molecule that is miscible with the ethylene copolymer and that has two or more hydroxyl groups. Preferred examples of suitable hydroxyl-containing crosslinking agents include, without limitation, diols such as 1,4-butanediol, 1,3-propanediol and 1,6-hexanediol. 1,4-Butanediol is particularly preferred.

The hydroxyl-containing crosslinking agent is included in the acid copolymer composition in an amount of up to about 5 wt %, preferably about 2 wt % or less or about 1.5 wt % or less, more preferably about 1 wt % or less, 0.5 wt % or less, or 0.25 wt % or less, or 0.1 wt %, based on total weight of the acid copolymer composition.

Those of skill in the art are able to determine an appropriate level of cross-linking based on the physical properties that are desired in the cross-linked composition. For example, higher levels of cross-linking are correlated with a higher flex modulus, better high temperature adhesion, lower melt indices, and better heat resistance. The level of cross-linking must be adjusted, however, so that the desired end use performance is obtained. Those of skill in the art are also aware that the time required to obtain a desired level of cross-linking depends directly on the concentration of carboxylic acid groups and hydroxyl—containing groups. Likewise, the time required to obtain a desired level of cross-linking can depend inversely on the temperature at which the cross-linking reaction is carried out, and also can depend inversely or in another negative logarithmic relationship on the melt index of the polymer blend. Further in this connection, cross-linking reactions can require heat, but the reaction may also be carried out using catalysis, or by using a combination of heat and catalysis. For example, esterification reactions are known to be catalyzed by acid catalysts and by base catalysts.

The hydroxyl-containing crosslinking agent can be added to the ionomer in any convenient manner. One particularly useful way is to add the agent to the ionomer flake, pellets or granules in the pre-mix chamber of an extruder. Another way to introduce this agent is through an injection port. As these materials are mixed, generally by tumbling or dry-auger blending, before going into the extruder, the cross-linking agent is incorporated into the polymer composition and may react so that the cross-linking occurs in the ionomer as it is extruded. Alternatively, the cross-linking reaction can take place during melt mixing or extrusion of the melt.

The cross-linkable polymer composition may optionally comprise one or more adjuvants. Examples of suitable adjuvants include silanes. When silanes are used, they can be added in amounts of between 0.025 wt % and 0.1 wt %, 0.25 wt %, 0.5 wt %, 0.75 wt % or 1.0 wt %, based on the total weight of the polymer composition. Non-limiting examples of preferred silanes include N-(2-aminoethyl-3-aminopropyl) trimethoxysilane, 3-glycidoxypropyl trimethoxysilane, and combinations thereof. The adjuvant can be added at the same time and in the same manner as the hydroxyl-containing crosslinking agent, or by any other known method.

Catalysts may also be included, such as the creation of either acidic or basic conditions to catalyze the cross-linking reaction. Alternatively, a specific catalyst, such as dibutyl tin oxide or similar compound, may be employed.

The present invention also includes a product of cross-linking the ethylene acid copolymer or ionomer composition, so that at least a portion of the carboxylic acid groups of one or more ethylene acid copolymer (or ionomer) molecules are reacted with at least two hydroxyl groups of the hydroxyl-containing crosslinking agent, thereby forming cross-links between or within the ethylene acid copolymer (or ionomer) molecules. In one embodiment, at least a portion of the carboxylic acid groups of two or more ethylene acid copolymer (or ionomer) molecules are reacted with at least two hydroxyl groups of the hydroxyl-containing crosslinking agent, thereby forming cross-links between the ethylene acid copolymer (or ionomer) molecules.

The resulting cross-linked polymer composition may have a MFR of 25 g/10 min or less, or about of 20 g/10 min or less, or about 10 g/10 min or less, or about 5 g/10 min or less, or about 0.7 to about 5 g/10 min or to about 7.5 g/10 min, as determined in accordance with ASTM method D1238-89 at 190° C. and 2.16 kg.

Without wishing to be held to theory, it is believed that the ethylene acid copolymers and ionomers described herein are surprisingly well-suited for use with the polyhydroxyl cross-linking agents and silane adjuvants. In particular, the creep resistance of the copolymers and ionomers described herein exhibits favorable effects when cross-linked, when compared with conventional ethylene acid copolymers and ionomers that are cross-linked using the same system. In particular, the cross-linked acid copolymers and ionomers described herein exhibit greater elongation with integrity when compared to sheets or films of previously known acid copolymers and ionomers that are cross-linked using the same system. The term "elongation with integrity", as used herein, refers to the ability of a film to stretch by 10% or greater without incurring any defects that would impair performance. Non-limiting examples of such defects include breaking, stretching and necking down to a thin fiber-like construction, and material unable to support its own weight.

Further provided are articles comprising the ethylene acid copolymers and ionomers described herein and articles comprising the products of cross-linking the ethylene acid copolymers and ionomers described herein. More specifically, the polymers and compositions described herein are suitable for use in various objects including packaging films or sheets and injection molded or thermoformed articles. Accordingly, provided herein are sheets and films comprising or made from the polymer composition. Further provided are sheets and films comprising or made from a product of crosslinking the polymer composition.

The difference between a film and a sheet is the thickness; however, there is no set industry standard as to when a film becomes a sheet. As used herein, the term "film" refers to a structure having a thickness of about 20 mils (0.50 mm) or less, and the term "sheet" refers to a structure having a thickness of greater than about 20 mils (0.50 mm). Nevertheless, when the polymer compositions are in sheet form, they can be of any useful thickness. For example, when used as packaging films, these polymer compositions can have a thickness between about 0.4 mil and about 20 mils (about 10 to about 500 micrometers), and preferably between about 0.9 and about 6 mils (about 25 to about 150 micrometers). The packaging films can comprise more than one layer.

Sheets comprising the polymer compositions may be formed by any suitable method, including without limitation dipcoating, solution casting, compression molding, injection molding, lamination, melt extrusion casting, blown film, extrusion coating, tandem extrusion coating, or by a combination of two or more of these methods. Preferably, the sheets are formed by an extrusion method, such as melt extrusion casting, melt coextrusion casting, melt extrusion coating, or tandem melt extrusion coating processes.

In another embodiment, the article is a film or sheet, which may be prepared by any convention process, such as, dipcoating, solution casting, lamination, melt extrusion, blown film, extrusion coating, tandem extrusion coating, or by any other procedures that are known to those of skill in the art. In certain embodiment, the films or sheets are formed by melt extrusion, melt coextrusion, melt extrusion coating, blown film process, or tandem melt extrusion coating process.

Alternatively, the article comprising the polymer composition described herein is a molded article, which may be prepared by any conventional molding process, such as, compression molding, injection molding, extrusion molding, blow molding, injection blow molding, injection stretch blow molding, extrusion blow molding and the like. Articles may also be formed by combinations of two or more of these processes, such as for example when a core formed by compression molding is overmolded by injection molding.

Information about these fabrication methods may be found in reference texts such as, for example, the *Kirk Othmer Encyclopedia*, the *Modern Plastics Encyclopedia*, McGraw-Hill (New York, 1995) or the *Wiley Encyclopedia of Packaging Technology*, 2d edition, A. L. Brody and K. S. Marsh, Eds., Wiley-Interscience (Hoboken, 1997).

In one alternative, the article comprising the polymer composition disclosed herein is an injection molded article having a minimum thickness (i.e, the thickness at the smallest dimension of the article) of at least about 1 mm. Alternatively, the injection molded article may have a thickness of about 1 mm to 100 mm, or 2 mm to 100 mm, or 3 to about 100 mm, or about 3 to about 50 mm, or about 5 to about 35 mm.

In yet another alternative, the article is an injection molded article in the form of a multi-layer structure (such as an over-molded article), wherein at least one layer of the multi-layer structure comprises or consists essentially of the ionomer composition disclosed above and that layer has a minimum thickness of at least about 1 mm. Preferably, the at least one layer of the multi-layer article has a thickness of about 1 to about 100 mm, or 2 mm to 100 mm, or 3 to about 100 mm, or about 3 to about 50 mm, or about 5 to about 35 mm.

In yet another alternative, the article is an injection molded article in the form of a sheet, a container (e.g., a bottle or a bowl), a cap or stopper (e.g., for a container), a sealant for a container (a bottle cap liner), a tray, a medical device or instrument (e.g., an automated or portable defibrillator unit), a handle, a knob, a push button, a decorative article, a panel, a console box, or a footwear component (e.g., a heel counter, a toe puff, or a sole).

In yet another alternative, the article is an injection molded intermediate article for use in further shaping processes. For example, the article may be a pre-form or a parison suitable for use in a blow molding process to form a container (e.g., a cosmetic container). The injection molded intermediate article may be in the form of a multi-layer structure such as the one described above, and it may therefore produce a container having a multi-layer wall structure.

In yet another alternative the article is an injection molded article in the form of a golf ball or a sub-part of a golf ball, for example a core or a mantle of a golf ball.

Injection molding is a well-known molding process. When the article disclosed herein is in the form of an injection molded article, it may be produced by any suitable injection molding process. Suitable injection molding processes include, for example, co-injection molding and over-molding (also referred to as two-shot or multi-shot molding processes).

When the injection molded article is produced by an over-molding process, the polymer composition may be used as the substrate material, the over-mold material or both. In certain articles, when an over-molding process is used, the polymer composition disclosed herein may be over-molded on a glass or metal container. Alternatively, the polymer compositions may be over-molded on any other articles (such as house items, medical devices or instruments, electronic devices, automobile parts, architectural structures, sporting goods, and etc.) to form a soft touch and/or protective overcoating. When the over-mold material comprises the polymer composition described herein, the melt index of the polymer composition is preferably from 0.75 up to about 25 g/10 min, as determined in accordance with ASTM D1238 at 190° C. and 2.16 kg.

In fabrication processes that incorporate a form of blow molding, such as, for example, injection blow molding, injection stretch blow molding and extrusion blow molding, the polymer composition may notably comprise an ionomer having zinc cations. Also preferably, the precursor acid copolymer preferably has a melt index of about 10 to about 100 g/10 min, or about 10 to 70 g/10 min, as determined in accordance with ASTM D1238 at 190° C. and 2.16 kg. In addition, the zinc ionomer preferably has a melt index of from about 0.1 to about 2.0 g/10 min, as determined in accordance with ASTM D1238 at 190° C. and 2.16 kg.

The polymer composition may be molded at a melt temperature of about 120° C. to about 250° C., or about 130° C. to about 210° C. In general, slow to moderate fill rates with pressures of about 30 to about 210 MPa or of about 69 to about 110 MPa may be used. The mold temperatures may be in the range of about 5° C. to about 50° C. Based on the polymer composition and the process type that is to be used, one skilled in the art would be able to determine the proper molding conditions required to produce a particular type of article.

One preferred injection molded article is a golf ball. For example, without limitation, injection molding conditions may include temperatures, pressures and cycle times as indicated in Table A.

TABLE A

| | Temperature (° C.) | Injection Pressure (mPa) | Cycle Times (sec) |
|---|---|---|---|
| Melt | 160-260 | Packing 25-180 | Filling and Packing 40-90 |
| Mold Front/Back | 10-30 | Hold 5-15 | Hold 15-30 |
| | | | Cooling Time 50-100 |
| | | | Screw Retraction 5-50 |

The compositions described herein may be used with any type of ball construction. It may be used in the core, cover, or one or more intermediate layers of a golf ball. Suitable golf ball constructions, including one-piece golf balls, two-piece golf balls, three-piece golf balls and multi-piece golf balls, are described in U.S. Pat. Nos. 8,044,136 and 8,202,925, both issued to de Garavilla, and in the references cited therein.

The following examples are provided to describe the invention in further detail. These examples, which set forth a preferred mode presently contemplated for carrying out the invention, are intended to illustrate and not to limit the invention.

EXAMPLES

A. Materials

Acid copolymer resins and their ionomers were obtained from DuPont under the trademarks Nucrel®, Surlyn® or SentryGlas®. Alternatively, the polymers were synthesized by the methods described in U.S. Pat. No. 8,399,096. The first α,β-ethylenically unsaturated carboxylic acid was acrylic acid or methacrylic acid. As described above, a sufficiently high level and complementary amount of the derivative of the second α,β-ethylenically unsaturated carboxylic acid (here, i-butyl acrylate or n-butyl acrylate) was present in the reaction mixture. The compositions of the synthesized polymers, which are set forth in Table 1, were determined by nuclear magnetic resonance (NMR) spectroscopy, by titration, or by mass balance methods. The counterions of the ionomers were sodium cations.

B. Methods

The acid copolymers and ionomers were subjected to differential scanning calorimetry analysis in accordance with ASTM D3418 and as described in U.S. Pat. No. 8,399,096. The enthalpies of crystallization are reported in Table 1. The results demonstrate that the crystallization enthalpies of each of the ionomers described herein (Examples 2 and 3) is less than 7 j/g, while the prior art ionomer at the same neutralization level (Comparative Example CE2) has a crystallization enthalpy greater than 15 j/g.

The acid copolymers and ionomers are also formed into sheets, which in turn are used as interlayers in glass laminates. Again, the methods are set forth in U.S. Pat. No. 8,399,096.

As shown by Comparative Example CE2, the haze level of a glass laminates comprising a prior art ionomer interlayer sheet is strongly dependent on the cooling rate under which the laminate is obtained. In general, slower cooling rates increase the laminates' haze. As illustrated by Table 1, however, glass laminates comprising interlayer sheets made from the acid copolymers and ionomers described herein (Examples 1, 2 and 3) tend to have lower haze than those comprising prior art acid copolymer and ionomer interlayer sheets (Comparative Examples CE1 and CE2). Moreover, the haze levels of laminates of Examples 2 and 3 were affected to a significantly lesser extent than to Comparative Examples CE2 by the cooling rate under which the laminates were obtained.

TABLE 1

| | Composition | | | Enthalpy | Haze (%) at Cooling Rate (C./min) | | | | |
|---|---|---|---|---|---|---|---|---|---|
| Example No. | Wt % Acid | Wt % Alkyl Acrylate | Neutrn. % | of Crystn., j/g | 0.1 | 0.2 | 0.3 | 0.4 | Quick |
| CE1 | 21.8 | 0 | 0 | 38.82 | 52.4 | 35.2 | 27.0 | 24.0 | 2.0 |
| CE2 | 21.8 | 0 | 25.7 | 17.58 | 8.6 | 4.7 | 4.1 | 3.2 | 0.8 |
| CE3 | 22.1 | 0 | 53.0 | 0.00 | 0.6 | 0.2 | 0.3 | 0.3 | 0.2 |
| 1 | 22 | 10* | 0 | 11.50 | 19.8 | 8.1 | 2.7 | 2.4 | 0.4 |
| 2 | 22 | 10* | 25.0 | 6.97 | 1.6 | 0.4 | 0.3 | 0.3 | 0.3 |
| 3 | 22 | 10** | 25.7 | 6.60 | 2.9 | 1.5 | 0.9 | 0.7 | 0.7 |

Notes:
*contains i-butyl acrylate;
**contains n-butyl acrylate

While certain of the preferred embodiments of this invention have been described and specifically exemplified above, it is not intended that the invention be limited to such embodiments. Various modifications may be made without departing from the scope and spirit of the invention, as set forth in the following claims.

What is claimed is:

1. A polymer composition comprising:
   an ethylene acid copolymer,
   a hydroxyl-containing crosslinking agent, and
   a silane adjuvant;
   said ethylene acid copolymer comprising copolymerized units of ethylene, about 10 wt % to about 30 wt % of copolymerized units of a first α,β-unsaturated carboxylic acid having 3 to 10 carbon atoms and about 5 wt % to about 15 wt % of copolymerized units of a derivative of a second α,β-unsaturated carboxylic acid having 3 to 10 carbon atoms;
   wherein the weight percentages of the copolymerized units are based on the total weight of the ethylene copolymer and the sum of the weight percentages of the copolymerized units is 100 wt %;
   wherein the hydroxyl-containing crosslinking agent is a diol selected from 1,4-butanediol, 1,3-propanediol, 1,6-hexanediol, or combinations thereof; and
   wherein at least a portion of the carboxylic acid groups of the first α,β-unsaturated carboxylic acid are neutralized to form an ionomer comprising carboxylate groups having counterions.

2. The polymer composition of claim 1, wherein about 5% to about 90% of the carboxylic acid groups present in the ethylene copolymer have been neutralized.

3. The polymer composition of claim 1, wherein the ethylene copolymer comprises about 20 wt % to about 24 wt % of copolymerized units of the first α,β-ethylenically unsaturated carboxylic acid.

4. The polymer composition of claim 1, wherein the ethylene copolymer comprises about 8 wt % to about 12 wt % of copolymerized units of the derivative of the second α,β-ethylenically unsaturated carboxylic acid.

5. The polymer composition of claim 1, wherein the sum of the weight percentages of the copolymerized acid and of the copolymerized acid derivative is about 20 to about 45 wt %.

6. The polymer composition of claim 1, wherein the α,β-ethylenically unsaturated carboxylic acid is acrylic acid, methacrylic acid, or a combination of acrylic acid and methacrylic acid.

7. The polymer composition of claim 1, wherein the diol is 1,4-butanediol.

8. The polymer composition of claim 1, wherein the amount of the diol is less than about 5 wt %, based on the total weight of the polymer composition.

9. The polymer composition of claim 1, wherein the silane adjuvant comprises both N-(2 aminoethyl-3-aminopropyl) trimethoxysilane and 3-glycidoxypropyl trimethoxysilane; and wherein the amount of the silane adjuvant is between about 0.025 wt % and 2.0 wt %, based on the total weight of the polymer composition.

10. A product of cross-linking the polymer composition of claim 1.

11. A sheet or film comprising the polymer composition of claim 1 or a product of cross-linking the polymer composition.

12. The film of claim 11 that is a blown film.

13. An injection molded article comprising the polymer composition of claim 1 or a product of cross-linking the polymer composition.

14. A golf ball comprising the polymer composition of claim 1 or a product of cross-linking the polymer composition.

15. A package comprising the sheet or film of claim 11.

16. A sheet or film comprising the polymer composition of claim 9 or a product of cross-linking the polymer composition.

17. The film of claim 16 that is a blown film.

18. An injection molded article comprising the polymer composition of claim 9 or a product of cross-linking the polymer composition.

19. A golf ball comprising the polymer composition of claim 9 or a product of cross-linking the polymer composition.

20. A package comprising the sheet or film of claim 16.

* * * * *